Jan. 29, 1946.  L. C. BLAIR  2,393,882
HYDRAULIC TRANSMISSION CONTROL
Filed Feb. 4, 1944  3 Sheets-Sheet 1
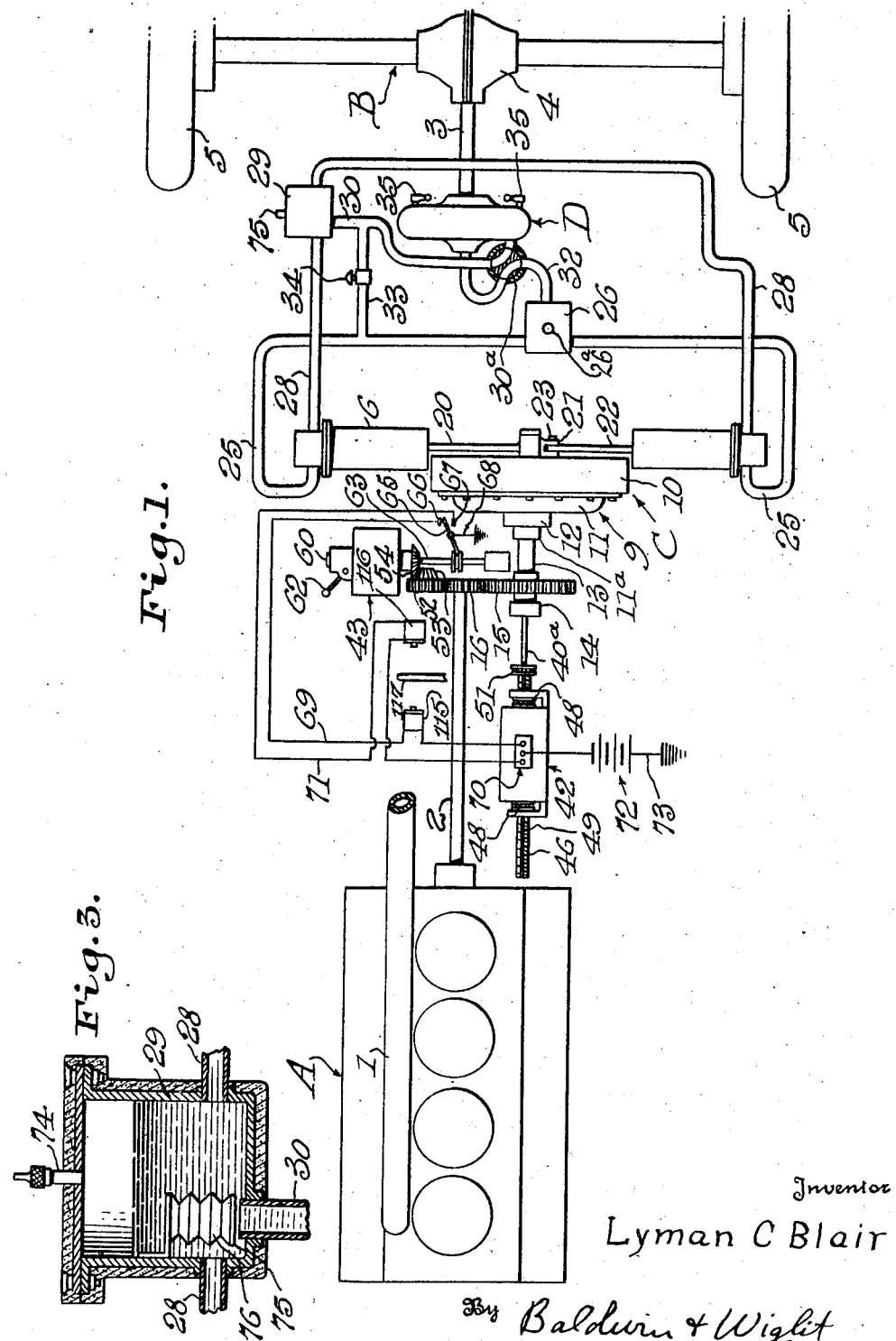
Inventor
Lyman C Blair
By Baldwin & Wight
his Attorneys

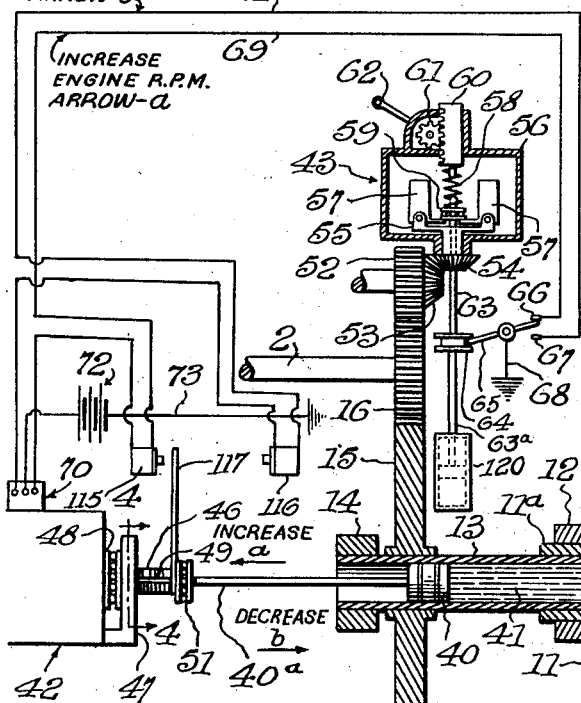
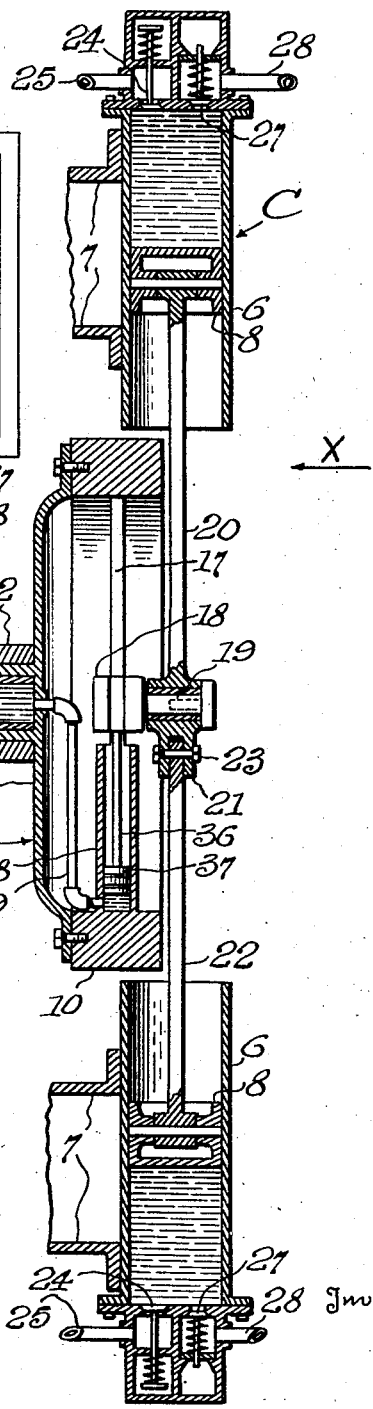
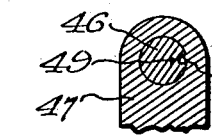
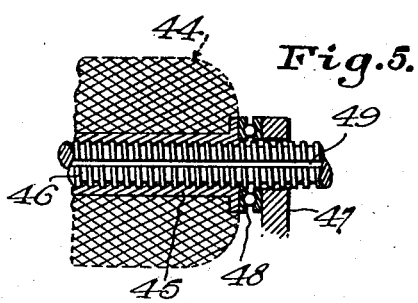

Jan. 29, 1946.  L. C. BLAIR  2,393,882
HYDRAULIC TRANSMISSION CONTROL
Filed Feb. 4, 1944 3 Sheets-Sheet 3

Inventor
Lyman C. Blair
By Baldwin & Wight his Attorneys

Patented Jan. 29, 1946

2,393,882

UNITED STATES PATENT OFFICE 2,393,882

HYDRAULIC TRANSMISSION CONTROL

Lyman C. Blair, Houston, Tex.

Application February 4, 1944, Serial No. 521,088

11 Claims. (Cl. 60—19)

This invention relates to hydraulic transmission control and more particularly to controls for hydraulic mechanism adapted for the transmitting of power from internal combustion engines to the driving elements, such as the wheels, of automobiles, trucks, railway rolling stock and the like.

This application is a continuation-in-part of my co-pending application Serial No. 456,420, filed August 27, 1942, issued March 6, 1945, as Patent No. 2,370,710.

One object of the invention is to provide a hydraulic transmission mechanism including a pump and associated controls of improved and simplified construction and which cooperate to provide stepless changes in the relative speeds of the pump and hydraulic motor driven thereby.

Another object is to provide a transmission mechanism of the character referred to in which, under ordinary or most conditions, the prime mover, e. g., internal combustion engine driving the pump, may be operated at a selected substantially constant speed, which should be the speed at which the engine operates most efficiently, and to automatically vary the ratio of engine speed to hydraulic motor speed to suit varying load conditions.

Another object is to provide a novel and improved governor control for a transmission mechanism of the kind referred to.

A further object is to provide control means for reducing the torque reaction on the engine in the event of a quick opening of the engine throttle valve so as to minimize or eliminate knocking such as otherwise would be apt to occur under such conditions.

Other objects will become apparent from a reading of the following description, the appended claims, and the accompanying drawings, in which:

Figure 1 is a somewhat diagrammatic plan view showing portions of a motor vehicle equipped with hydraulic transmission and control mechanism embodying the invention;

Figure 2 is a fragmentary sectional view of a pump and control mechanism embodying the invention;

Figure 3 is a detail view in vertical section showing a pulsation dampening chamber;

Figure 4 is a fragmentary section on the line 4—4 of Figure 2;

Figure 5 is a fragmentary vertical section through a control motor armature and associated parts;

Figure 6:
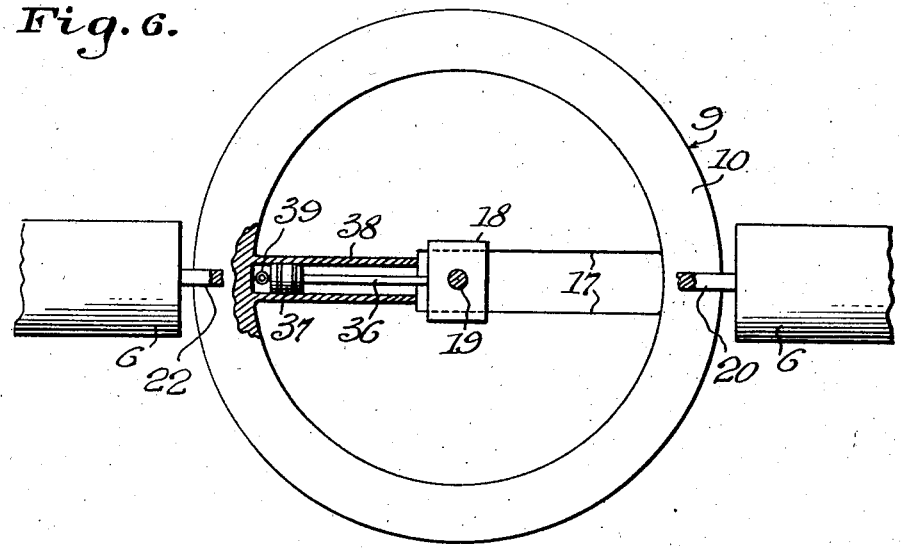
Figure 6 is a fragmentary view looking in the direction of the arrow X in Figure 2 with some parts shown in section.

Pumps and transmissions constructed in accordance with the invention may be used for many purposes including the driving of vehicles, boats, and trains, the operation of hoists, cranes, or other machinery. A preferred form of pump and transmission are shown as being designed for driving a vehicle but it will be understood that it is not intended to indicate that the invention is limited to application in connection with vehicles alone.

Figure 1 shows somewhat diagrammatically a hydraulic transmission embodying the invention in connection with a vehicle including an internal combustion engine prime mover A and a rear axle and wheel assembly B. The engine is shown as including an intake manifold or pipe 1 and drive shaft 2. The rear axle assembly B includes the usual drive shaft 3, differential gearing 4 and driving wheels 5—5. The hydraulic transmission for delivering power from the engine shaft 2 to the wheels 5 includes a pump generally designated C and a hydraulic turbine or motor D arranged to be supplied with working fluid under pressure delivered by a pump C through suitable pipes or conduits to be described.

In its more detailed nature the pump C is shown as including two cylinders 6—6 stationarily mounted on brackets 7—7 with their axes radial to the shaft 13. It will be understood that any desired number of radially disposed cylinders may be employed, although as a general rule a plurality of cylinders is desirable in the interest of smooth fluid delivery with minimum fluctuation in the discharge pressure. Reciprocally mounted in each of the cylinders 6 is a piston 8. A rotor generally designated 9 comprises a fly wheel 10 mounted on a web 11 provided with a hub 11ᵃ journaled in a fixed bearing 12. Fast to and rotatable with the rotor 9 is a hollow shaft 13 journaled at its end remote from the rotor 9 in a bearing 14. A gear 15 secured to the hollow shaft 13 meshes with a gear 16 rotatable with the engine shaft 2, the arrangement being such that the rotor 9 is driven by power supplied by the engine shaft.

Connections are provided between the rotor 9 and the pistons 8 for reciprocating the latter consequent upon rotation of the rotor 9, the arrangement being such that magnitude of piston strokes can be varied so as to control the pump output in a manner to maintain the speed of the engine A substantially constant at its optimum value, for example, at 2500 R. P. M. or at or near a value selected by the vehicle operator. The driving connections interposed between the rotor 9 and pistons 8 include a crosshead guide 17 preferably formed integrally with the fly wheel 10, a crosshead 18 slidable on the guide 17 and carrying a crosshead pin 19, and a connecting rod 20 interposed between the pin 19 and the piston 8 shown at the top of Figure 2. The connecting rod 20 is formed with a clevis 21 jointed to a connecting rod 22 by a knuckle pin 23, the rod 22 in turn being connected in the usual manner to the piston 8 shown at the bottom in Figure 2. During rotation of the rotor 9 with the pin 19 positioned eccentrically of the axis of rotation, the pistons 8 will be reciprocated in their associated cylinders 6, the length of their strokes being dependent upon the degree of eccentricity of the crosshead pin 19.

Each cylinder is provided at its outer end with an intake valve 24 adapted to control the admission of fluid through a pipe line 25 leading to a reservoir 26 equipped with a breather cap 26ª. For controlling the delivery of fluid under pressure from the cylinders, the latter are provided with discharge valves 27 adapted to open during the outward strokes of the pistons 8 to permit pressure fluid to flow through delivery pipes 28 into a thermally insulated pulsation dampening chamber 29 and thence through a pipe 30 and reversing valve 30ª to the turbine or fluid motor D coupled as aforesaid to the shaft 3 of the rear end assembly B, the shaft 3 constituting the driven element to which the hydraulic transmission delivers power. Fluid which is passed through the turbine or motor D flows through a return pipe 32 and the reversing valve 30ª to the receiver 26, thus completing the fluid circuit. In order to prevent the building up of excessive or unsafe pressures a relief conduit 33 interposed between the high pressure conduit 30 and one low pressure conduit 25 is equipped with a pressure responsive overload or relief valve 34.

The specific form of turbine or motor D does not form part of the present invention and any one of a number of well known hydraulic motors or turbines may be employed. The turbine D includes control levers 35 adapted to operate deflecting vanes (not shown).

As has been indicated hereinabove, the eccentricity of the crosshead pin 19 determines the rate of discharge of the pump C. Mechanism is provided for changing the eccentricity of the pin 19 in response to deviations in the engine speed. The crosshead 18 has connected to it a rod 36 provided at its outer end with a crosshead-pin-positioning piston 37 reciprocally mounted in a crosshead-pin-positioning cylinder 38 formed integrally with a fly wheel 10. The cylinder 38 is connected by piping 39 to the interior of the hollow shaft 13 which latter constitutes a servo cylinder in which is mounted a servo piston 40. The arrangement is such that when the piston 40 is moved in the direction of the arrow b in Figure 2, the fluid 41 is forced through the pipe 39 into the outer end of the cylinder 38 and against the piston 37 so as to move the latter inwardly toward the axis of rotation and thereby move the crosshead 18 and crosshead pin 19 to an eccentric position such that rotation of the crosshead pin will reciprocate the pistons 8 in the pump cylinders 6. Inasmuch as the pump pistons 8 are working against pressure there will be back pressure exerted through the piston rods 20 and 22 tending to move the crosshead pin 19 to a concentric position. However, proper positioning of the piston 40 acting in opposition to the back pressure exerted through the piston rods 20 and 22 will maintain the crosshead pin in the desired eccentric position.

Power for moving the piston 40 for positioning the crosshead pin 19 is supplied by an electric motor 42 operated under the control of a governor generally designated 43. The motor 42 includes an armature 44 (see Figure 5) carried by a core or sleeve 45 which is internally threaded to mesh with the exterior threading on a supporting screw 46 mounted on bearing brackets 47. Thrust bearings 48 are interposed between the ends of the armature sleeve 45 and the brackets 47. A slot 49 extending along the screw 46 receives tongues 50 extending inwardly from the bearing brackets. The arrangement is such that when the armature sleeve 45 is rotated, it is prevented by the bearings 48 and brackets 47 from moving axially and consequently the screw 46 which is held against rotation by the slot 49 and tongue 50 will be moved longitudinally. Longitudinal movement of the screw in the direction of the arrow b in Figure 2 transmits thrust through a bearing 51 to a rod 40ª connected to the piston 40 so as to move the latter in the direction of the arrow b and thus shift the crosshead pin 19 away from the axis of the shaft 13 in the manner previously described.

In accordance with the invention, mechanism of the kind thus far described may be equipped with governing means for maintaining the speed of the engine A substantially constant at a selected value. Preferably this is accomplished by automatically increasing the rate of pump discharge in response to an increase in engine speed, thus increasing the torque reaction on the engine to slow it down, and conversely by decreasing the rate of pump discharge in response to a decrease in engine speed, thus reducing the torque and causing the engine to speed up.

As shown in Figures 1 and 2, a gear 52 meshing with the engine driven gear 16 is fast with a bevel gear 53 meshing with a bevel gear 54 which is fast with a governor yoke 55 journaled in a governor casing 56. The governor yoke mounts fly weights 57 which are urged to their inner positions as shown in Figure 2 by means of a spring 58 interposed between a thrust bearing 59 overlying the fly weight wings and a rack bar 60 which meshes with a pinion 61 rotatable by means of a control lever 62. Shifting of the lever 62 will raise or lower the rack bar 60 so as to decrease or increase the compression of the spring 58, thus decreasing or increasing the speed at which the governor will respond for effecting its control. Extending downwardly from the thrust bearing 59 and being slidable through the hub of the yoke 55 is a stem 63 equipped at its lower end with a grooved collar 64. One end of a switch lever 65 is received in the collar groove and the other end of the lever is arranged to engage selectively contact points 66 and 67. The lever 65 itself is connected through a conductor 68 to a ground.

The contact point 66 leads through a conductor 69 to one side of motor reversing mechanism indicated at 70 and the contact point 67 leads through a conductor 71 to the other side of the reversing mechanism. The middle connection of the reversing mechanism is led to a battery 72 and thence through a conductor 73 to the ground.

In operation and with the crosshead pin 19 at a given position of eccentricity, the engine A will continue to operate at the desired substantially constant speed until some change in the driving conditions causes the load either to increase resulting in a tendency of the engine to slow down, or to decrease resulting in a tendency for the engine to increase in speed. If it be supposed that the load increases and the engine speed decreases, the governor fly weights 57 will be moved inwardly by pressure exerted by the spring 58, thereby lowering the governor stem 63 and moving the contact lever 65 into engagement with the contact point 66. The circuit through the battery 72, the ground, and the conductor 68 to the motor reversing mechanism 70 will cause the motor 42 to run in a direction so as to move the screw 46 in the direction of the arrow $a$ in Figure 2. This will move the piston 40 also in the direction of the arrow $a$ so as to permit the piston 37 to move outwardly in the cylinder 38 and allow the crosshead 18 and pin 19 to move toward a concentric position. The rate of pump discharge will be decreased more than in proportion to the decrease of the engine speed. When the eccentricity of the crosshead pin 19 is reduced the torque reaction on the engine drive shaft 2 is lessened and the engine speed will increase until the governor responds to move the contact lever 65 out of engagement with the contact point 66. As soon as this has happened the motor 42 will cease operating and the crosshead pin 19 will be held in its new position of eccentricity until a further change in the load causes the governor to respond again.

If, however, the load should decrease, there would be a tendency for the engine A to increase its speed. The governor would then respond to move the lever 65 into engagement with the contact point 67, completing a circuit through the conductor 71, and causing the motor 42 to operate so as to move the screw 46, rod 46ª and piston 40 in the direction of the arrow $b$. Fluid forced by the piston 40 into the cylinder 38 would move the piston 37 inwardly so as to increase the eccentricity of the crosshead pin 19. The rate of pump discharge would then increase more than in proportion to the increase of the engine speed. The torque reaction exerted on the engine drive shaft 2 would be increased and the engine A would slow down.

Figure 3 shows in some detail the construction of the pulsation dampening chamber 29. It is shown as comprising a thermally insulated air tight casing with which the delivery pipes 28 and the pipe 30 communicate. An inflation valve 74 at the top of the chamber is provided for introducing elastic fluid, for example air, under pressure. A normally open valve 75 provides for communication between the interior of the chamber and the pipe 30 under ordinary conditions. However, if the vehicle should be coasting down a steep hill, there would be a tendency for the turbine D to "run ahead" of the pump C which might draw all of the pressure fluid out of the chamber 29 and permit the air or other expansible cushioning fluid to leak out of the chamber into the system piping. For preventing this, the valve 75 is arranged to be closed automatically in response to the falling of the pressure fluid level in the chamber 29 or the falling of the unit pressure in the chamber. This may be accomplished by any suitable device such as a float directly responsive to falling of liquid level, or in the form shown, the valve 75 is carried by a Sylphon bellows actuator 76 which is filled with gas under compression and is adapted to expand and close the valve when the pressure in the chamber 29 falls below a predetermined value. For the purposes of clear illustration the chamber 29 is shown somewhat removed from the cylinders. However in practice it is desirable that the chamber be located as close as possible to the pump cylinder or cylinders. In a multi-cylinder pump a separate pulsation dampening chamber may be provided for each cylinder, each chamber being positioned adjacent the discharge valve of the associated cylinder.

In order to maintain the rotor 9 and parts carried thereby substantially in balance, a very heavy fluid may be used for transmitting movement from the piston 40 to the piston 37. By referring to Figures 2 and 6, it will be seen that when fluid is forced into the cylinder 38, a movement of the crosshead 18 to the eccentric position on one side of the axis of the rotor 9 will be accompanied by the introduction of an additional quantity of very heavy fluid into the outer end of the cylinder 38 and on the opposite side of the rotor axis. The additional heavy fluid has the effect of compensating for the shifting of the crosshead, thus maintaining the rotor substantially balanced. Mercury, which has all the fluid characteristics required for transmitting motion from the piston 40 to the piston 37 and which also is very heavy, may be employed for this purpose.

Figure 7:
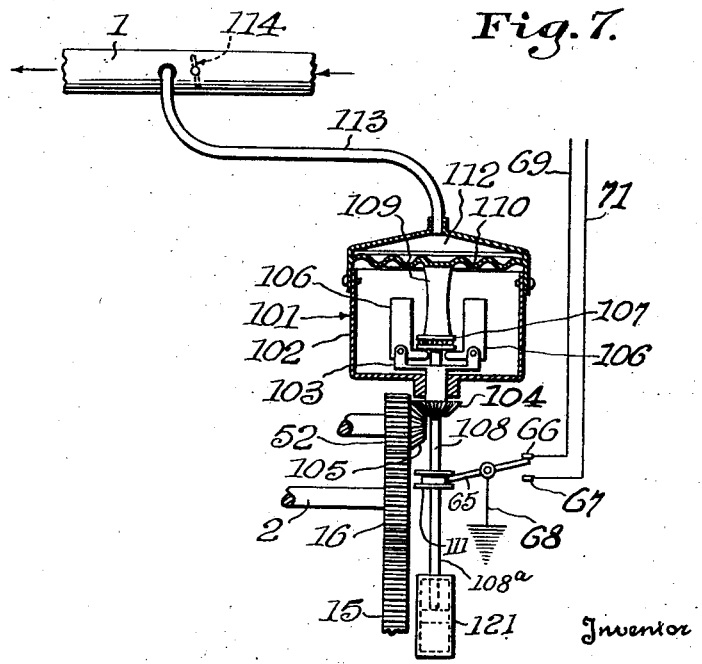
Figure 7 is a view, partially in elevation and partly in vertical section, of a governor for controlling the transmission mechanism shown in Figures 1 to 6 inclusive in dependence upon changes in the pressure inside the intake manifold of the internal combustion engine prime mover.

Figure 7 shows a governor which may be used in place of the governor 43 shown in Figures 1 and 2 for responding to a sudden wide opening of the throttle valve of the engine A for decreasing the load on the engine and thereby preventing knocking. The governor shown in Figure 7 is generally designated 101 and includes a casing 102 on which is journalled a rotary yoke 103 equipped with a bevel gear 104 meshing with a bevel gear 105 fast with the gear 52 which is driven by the gear 16 on the engine shaft 2. Fly weights 106 pivoted on the yoke 103 are provided with wings underlying a thrust bearing 107 suspended from which is a stem 108. A strut 109 is interposed between thrust bearing 107 and a flexible corrugated disc-like diaphragm 110. At its lower end the stem 108 is equipped with a grooved collar 111 which receives one end of the contact lever 65 whose other end is cooperable with contact points 66 and 67 as in the embodiment shown in Figures 1 and 2. The top of the governor casing 102 and the diaphragm 110 conjointly define a chamber 112 connected through a pipe 113 to the intake manifold 1 of the engine A, a throttle valve 114 being interposed in the manifold.

In operation, with the engine A running at its selected speed and driving through the transmission under normal load conditions, a sudden opening of the throttle valve 114 will result in a lessening of vacuum or stated differently, an increase in pressure in the manifold 1 and the chamber 112. The diaphragm 110 normally held slightly elevated by the vacuum in the chamber 112, will then be pressed downwardly by the increased pressure and the resiliency of the diaphragm itself to cause the strut 109 to bear upon the thrust bearing 107 against the lifting urge of the fly weights 106, thereby lowering the stem 109 and causing the lever 65 to engage the contact point 66. As previously explained, such engagement will close a circuit through the conductor 69 to the reversing mechanism 70 to effect operation of the motor 42 so as to move the screw 46, rod 40ª, and piston 40 in the direction of the arrow a in Figure 2. This will result in shifting of the crosshead pin 19 inwardly to a position of less eccentricity, thereby decreasing the torque reaction on the engine A and eliminating or minimizing knocking. The speed of the engine A will then increase so as to restore the normal vacuum condition in the manifold 1 and governor chamber 112, after which the fly weights 106 will take over the predominant control of the eccentric position of the crosshead pin 19.

Although under ordinary or most conditions the engine A will operate at a substantially constant speed selected as the engine's most efficient speed, it is intended that the throttle valve 114 may be opened farther than usual to increase the speed of the engine and the vehicle. Although the speed ratio between the pump and motor would remain the same and the engine efficiency would fall off, unusual speed requirements could be met at the will of the operator.

Preferably, limit or safety switches are included in the circuit controlling the motor 42 for preventing the screw 46 from over-running or travelling beyond its intended limits of motion. Such an arrangement is indicated diagrammatically in Figures 1 and 2 which show two normally closed limit switches 115 and 116 of a conventional type interposed respectively in the conductors 69 and 71. A bar 117 carried by the screw 46 is adapted to depress the button of and thus to open the switch 115 when the screw retracts the piston 40 to a predetermined limit position. Similarly, when the screw has moved the piston 40 in the opposite direction to a predetermined limit position, the bar 117 will engage the button of the switch 116, thereby opening the switch and stopping the motor 42. Thus the parts cannot be damaged by over-travelling of the screw 46 and piston 40.

Referring to Figure 2, the governor stem 63 may be extended downwardly at 63ª into a dash pot 120 for reducing hunting of the governor control mechanism. In the form shown in Figure 7 the stem 108 is extended downward as at 108ª into a dash pot 121.

The mechanism shown herein embodies the invention in the forms now preferred, but it will be understood that some changes may be made within the invention as defined by the claims.

I claim:

1. In combination, an internal combustion engine having an intake manifold; a pump; driving connections between the engine and pump; control means for varying the rate of pump delivery for a given engine speed; a hydraulic motor; means for delivering fluid under pressure from said pump to said motor; a governor responsive to increase in engine speed for operating said control means to more than proportionately increase the rate of discharge by the pump and responsive to decrease in engine speed for operating said control means to more than proportionately decrease the rate of discharge by the pump; and means responsive to increased pressure in said manifold for tending to operate said control means to reduce the rate of pump discharge.

2. Combination as set forth in claim 1 in which the means responsive to increased pressure in the manifold comprises a flexible diaphragm subjected to the manifold pressure and a connection between the diaphragm and the governor, the arrangement being such that increased pressure in the manifold urges the diaphragm to act in opposition to response of the governor to engine speed.

3. In combination, an internal combustion engine having an intake manifold and throttle valve for controlling flow through said manifold; a pump; driving connections between the engine and pump; control means for varying the rate of pump delivery for a given engine speed; a hydraulic motor; means for delivering fluid under pressure from said pump to said motor; a governor responsive to increase in engine speed for operating said control means to more than proportionately increase the the rate of discharge by the pump and responsive to decrease in engine speed for operating said control means to more than proportionately decrease the rate of discharge by the pump; and means responsive to quick opening of said throttle valve for tending to operate said control means to reduce the rate of pump discharge.

4. In combination, an internal combustion engine having an intake manifold; a pump; driving connections between the engine and pump; control means for varying the rate of pump delivery for a given engine speed; a hydraulic motor; means for delivering fluid under pressure from said pump to said motor; a governor responsive to increase in engine speed for operating said control means to increase the rate of discharge by the pump and responsive to decrease in engine speed for operating said control means to decrease the rate of discharge by the pump; and means responsive to increased pressure in said manifold for tending to operate said control means to reduce the rate of pump discharge, and including a pressure responsive element subjected to the manifold pressure, and a connection between said element and said governor, the arrangement being such that increased pressure in the manifold urges said element to act in opposition to response of the governor to engine speed.

5. In combination, an internal combustion engine having an intake manifold and throttle valve for controlling flow through said manifold; a pump; driving connections between the engine and pump; control means for varying the rate of pump delivery for a given engine speed; a hydraulic motor; means for delivering fluid under pressure from said pump to said motor; a governor responsive to increase in engine speed for operating said control means to increase the rate of discharge by the pump and responsive to decrease in engine speed for operating said control means to decrease the rate of discharge by the pump; and means responsive to quick opening of said throttle valve for tending to operate said control means to reduce the rate of pump discharge.

6. In combination, an internal combustion engine having an intake manifold; a pump; driving connections between the engine and pump; a hydraulic motor; means for delivering fluid under pressure from said pump to said motor; control means for varying the ratio between the fluid capacities of the pump and motor to thereby vary the driving speed ratio; a governor responsive to increase in engine speed for operating said control means to tend to increase the speed of the motor relative to the speed of the pump and responsive to decrease in engine speed for operating said control means to tend to decrease the speed of the motor relative to the speed of the pump; and means responsive to increased pressure in said manifold tending to operate said control means to decrease the speed of the motor relative to the speed of the pump.

7. Combination as set forth in claim 6 in which the means responsive to increased pressure in the manifold comprises a flexible diaphragm subjected to the manifold pressure and a connection between the diaphragm and the governor.

8. Combination as set forth in claim 6 in which the means responsive to increased pressure in the manifold comprises a movable element subjected to the manifold pressure and a connection between said element and the governor.

9. In combination, an internal combustion engine having an intake manifold and throttle valve for controlling flow through the manifold; a pump; driving connections between the engine and pump; a hydraulic motor; means for delivering fluid under pressure from said pump to said motor; control means for varying the ratio between the fluid capacities of the pump and motor to thereby vary the speed ratio; a governor responsive to increase in engine speed for operating said control means to tend to increase the speed of the motor relative to the speed of the pump and responsive to decrease in engine speed for operating said control means to tend to decrease the speed of the motor relative to the pump; and means responsive to quick opening of said throttle valve for tending to operate said control means to decrease the speed of the motor relative to the speed of the pump.

10. In combination, a prime mover; a pump; driving connections between the prime mover and the pump; a hydraulic motor; means for delivering fluid under pressure from said pump to said motor; and control means including a member movable for varying the ratio between the fluid capacities of the pump and motor to thereby vary the driving speed ratio, a hydraulic servo motor for operating said movable member, a reversible electric motor for operating said servo motor, a switch for stopping said motor and for effecting operation thereof selectively in opposite directions, and a governor responsive to changes in the prime mover speed for actuating said switch.

11. In combination, an internal combustion engine having an intake manifold; a pump; driving connections between the engine and the pump; a hydraulic motor; means for delivering fluid under pressure from said pump to said hydraulic motor; and control means for varying the ratio between the fluid capacities of the pump and the hydraulic motor to thereby vary the driving speed ratio comprising a movable member, a hydraulic servo motor for operating said movable member, a reversible electric motor for operating said servo motor, a switch for stopping said electric motor and for effecting operation thereof selectively in opposite directions, a governor responsive to increase in engine speed for operating said switch to effect operation of the electric motor in a direction to increase the ratio of the capacity of the pump to the capacity of the hydraulic motor and responsive to decrease in engine speed for effecting operation of the electric motor in a direction to decrease the ratio of the capacity of the pump to the capacity of the hydraulic motor, and means responsive to increased pressure in said manifold for tending to operate said control means to decrease the ratio of the capacity of the pump to the capacity of the hydraulic motor.

LYMAN C. BLAIR.